United States Patent

[11] 3,596,311

[72] Inventor Michel Salmon
 Lyon, France
[21] Appl. No. 715,388
[22] Filed Mar. 22, 1968
[45] Patented Aug. 3, 1971
[73] Assignee Rhone-Poulenc S. A.
 Paris, France

[54] APPARATUS FOR ISOTROPICALLY STRETCHING A PLASTICS SHEET
 6 Claims, 6 Drawing Figs.
[52] U.S. Cl..................................................... 18/1 FS, 18/19 R
[51] Int. Cl. ..................................................... B29c 17/00
[50] Field of Search............................................ 18/1 FS; 72/308, 392, 393

[56] References Cited
UNITED STATES PATENTS
2,752,630  7/1956  Taylor ........................... 18/1 FS
2,912,716  11/1959  Frownfelter et al. ......... 18/1 FS Primary Examiner—Andrew R. Juhasz
Assistant Examiner—Leon Gilden
Attorney—Cushman, Darby & Cushman ABSTRACT: The invention provides an apparatus for isotropically stretching a plastics sheet in which the sheet is gripped by a plurality of grippers, which are disposed in an array of a particular configuration, e.g. a circle or a square. In order to stretch the sheet the grippers are moved outwardly on screw-threaded rods which are geared together, e.g. by bevel gears, at a rate to maintain the same configuration.

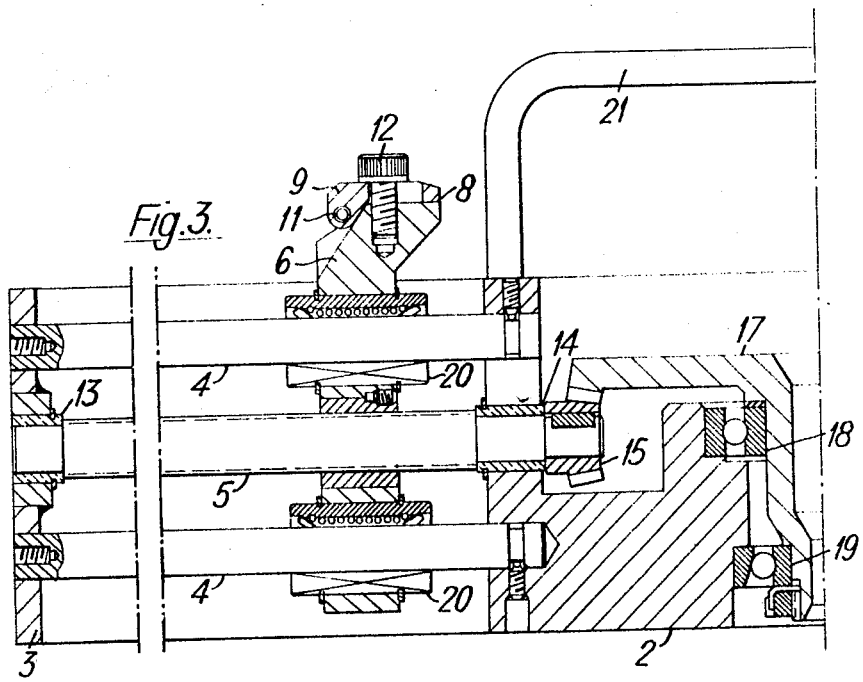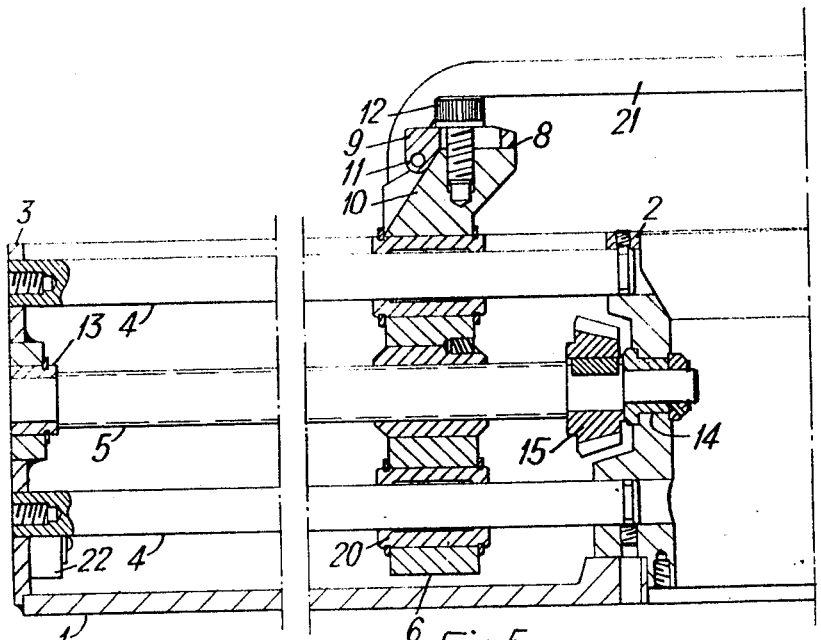

APPARATUS FOR ISOTROPICALLY STRETCHING A PLASTICS SHEET

The present invention relates to an apparatus for the uniform and substantially isotropic discontinuous stretching of sheet of plastics material, and process for stretching the sheets employing the apparatus.

Various apparatus have been constructed for the discontinuous stretching of sheets of plastics material. Some effect a biaxial stretching in two perpendicular directions; they result in anisotropic structures. Others effect stretching along multiple axes which are not uniformly distributed nor strictly defined; they result in irregularly anisotropic structures. It is often necessary to stretch articles in a uniform fashion in order to given them substantially equal mechanical, electrical and other properties in all directions.

Apparatus having already been constructed for stretching sheets along concurrent axes, resulting in articles which are substantially isotropic over a portion of their surface, but this substantially isotropic portion is always fairly limited. In addition, these apparatus are not always convenient to use and more particularly are not well adapted to laboratory needs. In fact, in some apparatus, the stretching means remain within a treatment chamber, which often results in difficulties in gaining access to the sheet when positioning it or when particular operations have to be carried out. This arrangement also results in long treatment times when it is necessary to operate successively at greatly differing temperatures. Apparatus have also been constructed which can be introduced into a treatment chamber, but the stretching means used and their arrangement result in heavy and bulky apparatus having regard to the dimensions of the stretched sheets, which involves the use of treatment chambers of large dimensions and considerable heating means. Furthermore these apparatus are equipped with only a small number of grippers to hold the sheet of plastics material, so that a considerable portion of the surface is not stretched uniformly and cannot be used.

The invention has as its object to provide an apparatus, which is particularly suitable for the needs of laboratories or testing departments, for the uniform and substantially isotropic stretching of sheets of plastics material.

The invention provides an apparatus for isotropically stretching a sheet of plastics, such apparatus comprising a plurality of screw-threaded rods mounted with their axes extending radially from a central member, a screw-threaded gripping means for the sheet mounted on each of the rods, the threads on the rods cooperating with the threads on the gripping means, the gripping means being disposed relative to one another in an array of a particular configuration and gearing interconnecting the rods whereby rotation of one of the rods will cause rotation of the remaining rods so that the gripping means move along their respective rod at a rate to maintain the configuration constant.

The construction of such an apparatus is simple and, having regard to the dimensions of the stretched sheets, the dimensions and weight of the apparatus are small, which makes it possible to use the apparatus in treatment chambers of small size.

Suitably there are at least five gripping means, and the gearing comprises a bevel gear. A number of arrangements of bevel gears can be employed; examples of these are a. a bevel gear is mounted at the inner end of each rod and cooperates with a single bevel gear mounted on the central member.

b. a bevel gear is mounted at the inner end of each rod and cooperates with the bevel gears on each of the adjacent rods, the pitch of the screw thread of each rod being opposite to the pitch of the thread of each adjacent rod.

c. a bevel gear is mounted at the inner end of each rod and cooperates with two idler gears, the idler gears each cooperating with the bevel gears on each of the adjacent rods.

The invention will be more fully understood from the following description given merely by way of example with reference to the accompanying drawings, in which:

FIG. 3 is a view similar to FIG. 1 of another form of the apparatus.

FIG. 5 is a view similar to FIG. 1 of a further embodiment.

Figure 1:
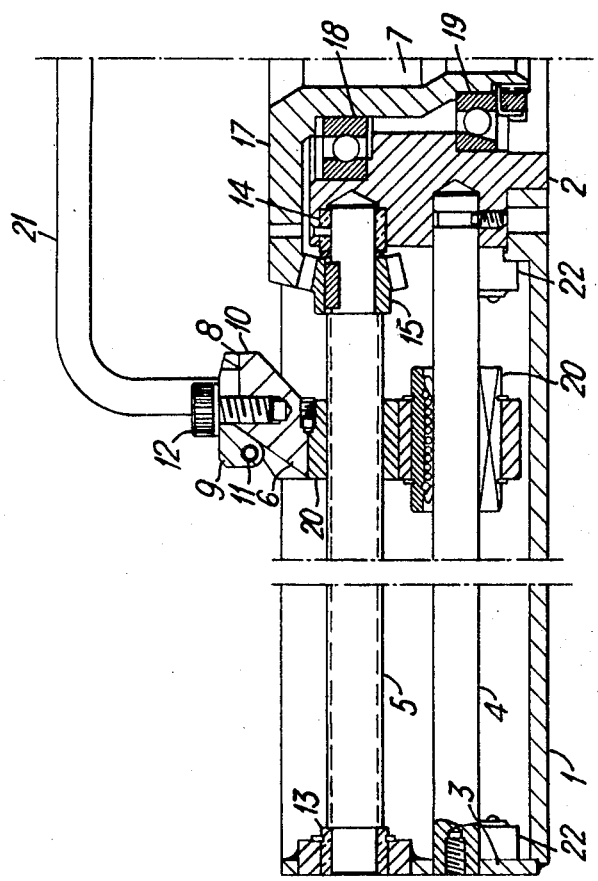
FIG. 1 is a schematic side elevation of one embodiment of apparatus according to the invention in a half view section.
Figure 2:
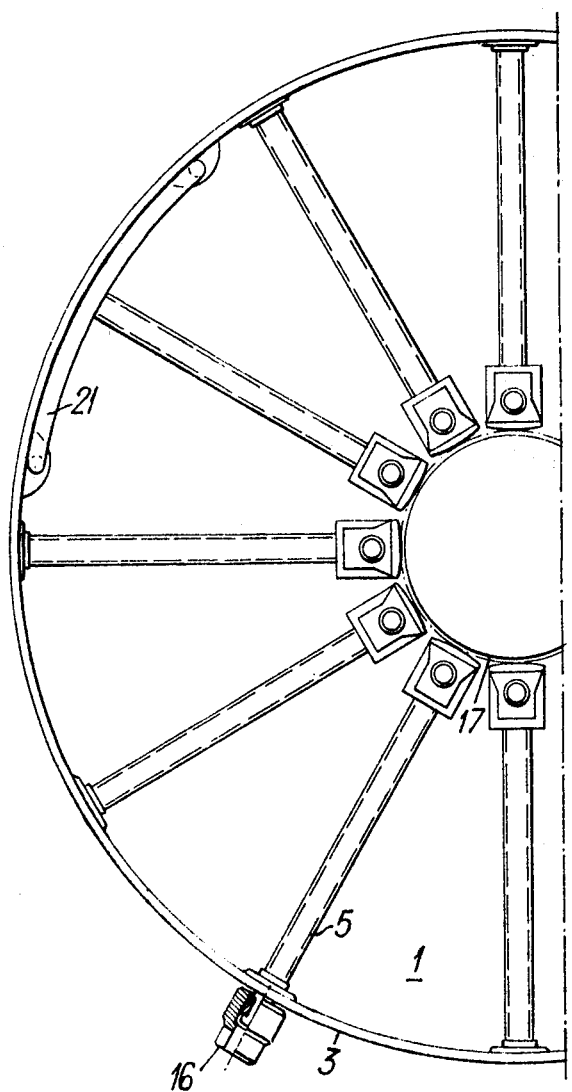
FIG. 2 shows a partial top plan view of the apparatus of FIG. 1.

Referring to FIGS. 1 and 2, a frame 1 carries a hollow hub 2 and a rim 3 coaxial with the hub to give a rigid assembly; attached to the rim is a handle 21 to permit easy manipulation of the apparatus. Around the hub are arranged, perpendicular to the axis of the hub, 12 sideways 4 and above them 12 screw-threaded rods 5, the slideways and rods being arranged in pairs, parallel, and in close proximity, to each other. Each rod carries a screw-threaded carriage 6, which has a hole therein so that the carriage can slide up and down the slideway. The carriage has a gripper 8 for the sheet to be stretched, the gripper consisting of two jaws 9 and 10 joined by a pivot 11 and clamped to one another by a screw 12. Each rod is seated in two bearings, one 13 in the rim and the other 14 in the hub, so that the rod can rotate freely. The rods each carry at their inner ends a bevel gearwheel 15, which cooperates with another level gearwheel 17 which is mounted on two bearings 18 and 19 situated in the bore of the hollow hub 2, so that when the rod is rotated, the bevel gearwheel 17 rotates on an axis at right angles to the axis of rotation of the rod thus driving the other rods. At the rim end of one of the rods is mounted a coupling device 16 which cooperates with a geared motor (not shown) to enable the rod to be rotated so that the carriages on that rod and on all the other rods can be moved simultaneously and at the same speed up and down the slideways. The travel of the carriages is limited at both ends by limit switches 22.

FIG. 3 shows a variant of the apparatus of FIGS. 1 and 2 which is identical to the latter except that there are two, instead of one, slideways, 4 and 5, one above and the other below the rod 5, and that the carriage has two holes, one for each slideway.

Figure 4:
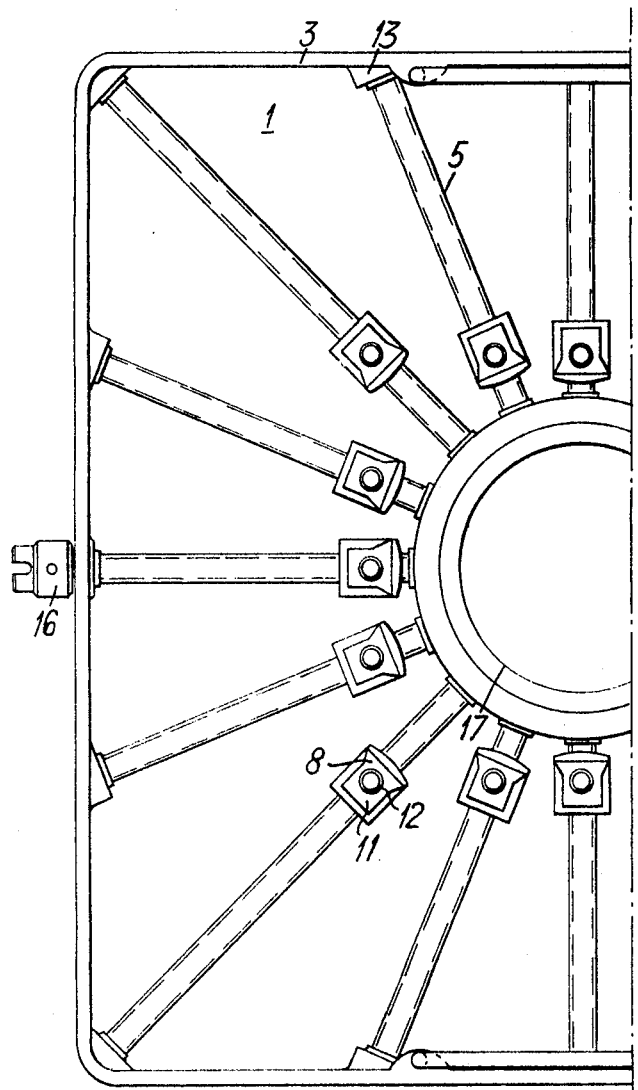
FIG. 4 is a view similar to FIG. 2 of a third embodiment.

FIG. 4 illustrates an apparatus for treating a square-shaped plastics sheet. The carriages are arranged in square array and the pitches of the rods are proportional to the distance of its carriage from the center of the square.

Figure 6:
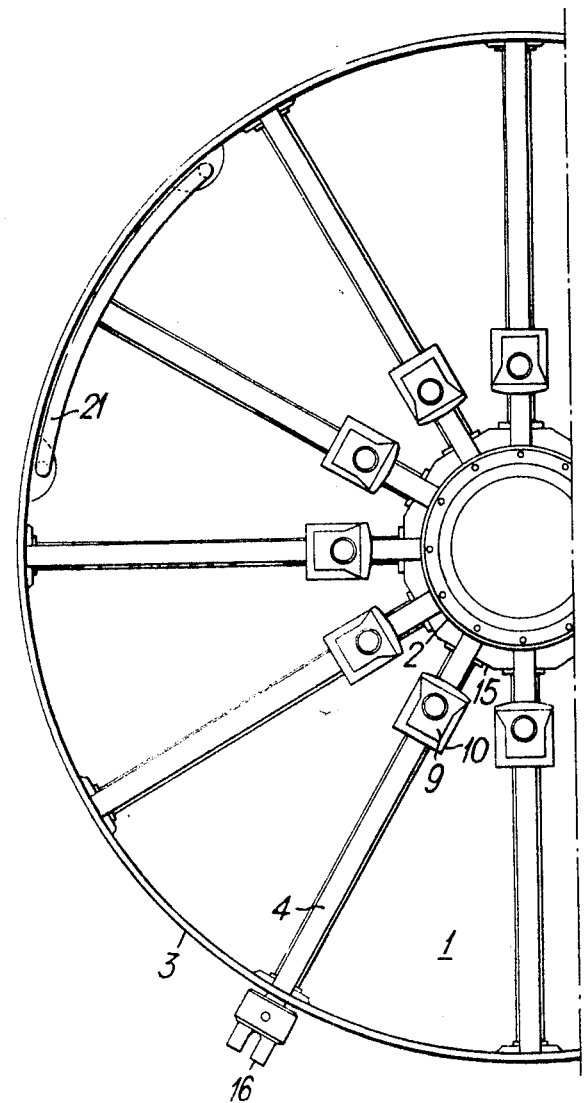
FIG. 6 shows a partial top plan view of the apparatus of FIG. 5.

In FIGS. 5 and 6, there is shown a variant of the apparatus of FIG. 3, which instead of having a bevel gearwheel situated in the bore of the hub, it has the bevel gearwheels mounted on each rod cooperating with those gearwheels on the adjacent rods. In order that all the carriages may be driven in the same direction, the pitch of the thread on each rod is opposite to that of its neighbors.

Another variant consists in arranging an intermediate bevel gearwheel between two neighboring bevel gearwheels 15. It is then possible to arrange an even or odd number of screw-threaded rods which all rotate in the same direction. The diameter of the intermediate or idler bevel gearwheel is not of critical importance; it is preferably less than or equal to the diameter of the bevel gearwheels mounted at the end of the rods. Thus the apparatus is equipped with two or three series of gearwheels which are arranged in a single circle or in two or three superposed circles coaxial with the hub.

The carriages are provided with sliding means constituted by smooth rings of bronze or ball bearing sleeves which slide along these slideways. The holding jaws of the gripper have their opposite faces grooved and one of the jaws is fixed and is integral with the carriage itself.

The frame is preferably plane and constituted by a rigid disc of sheet steel. The slideways are cylindrical steel rods.

In order to obtain completely satisfactory operation, it is preferable for the parts to be machined with precision, particularly the hub and the gearwheels. The manufacturing tolerances of these parts have to be all the more carefully observed if the apparatus has to be subjected to greater temperature ranges. The angular positions of the screw-threaded rods and the slideways, and the parallelism of the slideways with the screw-threaded rods are preferably precisely defined. The necessary play will be allowed to permit the slideways and the screw-threaded rods to slide in their respective bearings at the rim end and thus to expand freely.

The apparatus is preferably free of any device using balls such as a radial bearing, thrust bearing, sleeve etc., making it possible to avoid using lubricant with the risk of decomposition of such lubricant and fouling the plastics materials during the course of treatment when it is necessary to work with high temperatures. The parts subjected to friction can be specially treated, for example by a Sulfinuz process.

The toothing of the bevel gearwheels is generally ground, likewise the screw threads. The slideways, the screw threads and the frame are preferably made with the same material, for example steel, in order to limit the respective sliding due to expansion.

When the apparatus if provided with a central gearwheel, the latter can be formed with a coaxial hole permitting inter alia the introduction of a device for measuring the temperatures in the vicinity of the film being stretched.

When the apparatus has no central gearwheel, the gearwheels on the rods can be arranged on the radially inner side of the bearings 14; but preferably they will be arranged between the bearings 13 and 14, against the hub, in order to free the central funnel of the hollow hub of all mechanical elements. Generally the pinions 15 are identical and all mesh with one another; the driving forces are then automatically distributed at any instant in a balanced manner between the driving gearwheel and the gearwheel exerting the highest resistant torque, whatever their relative positions. This arrangement is particularly advantageous since, owing to the excellent distribution of driving forces, it is not necessary to overdimension the driving elements and furthermore the driving of the carriages is controlled in a flexible and gentle manner. It is rendered easier by the use of two slideways on either side of the screw-threaded rod.

The apparatus according to the invention can be used in the following manner:

The position of the carriages 6 is regulated so as to receive on the lower jaws the plastics sheet which is to be stretched and which has previously been cut to a circular shape. The jaws 9 and 10 of the clamping devices are opened, the plastics sheet is placed in position, and then the upper jaws are closed on the edges of the sheet which is gripped in the jaws by means of the screw 12. The sheet to be stretched being thus held, the apparatus is introduced into a heating chamber previously taken to a suitable temperature. Forced circulation of hot air permits obtaining the desired thermal equilibrium rapidly, and a uniform distribution of temperatures in the plastics material sheet. When the specific temperature for stretching is reached, by any suitable means, for example by means of a geared motor set situated preferably outside the heating chamber, and by means of the coupling device 16, one of the screw-threaded rods 5 is driven. The grippers 8 carried by the carriages 6 move away equally and progressively, whilst remaining on concentric circles of increasing diameter. The driving speed of the carriages 6 is regulated to a suitable value to ensure that the sheet is uniformly stretched without tearing, and this movement is continued until the desired extent of stretching has been achieved.

If the apparatus is of the form illustrated in FIG. 4, the grippers 8 are located in an array having the configuration of a square. As the rods 5 are rotated the pitch of the threads therein is such that the carriages 6 and gripper 8 move outwardly to maintain the square configuration, the size of the square, of course, increasing.

The apparatus can subsequently be taken out of the heating chamber and, after the cooling of the plastics material sheet, the jaws can be unclamped by means of the screws 12 and the stretched sheet withdrawn.

The apparatus according to the invention can be used horizontally so that the sheet to be stretched is arranged horizontally at its upper portion. The apparatus can also be used, if necessary, in any other position, and more particularly the sheet to be stretched can be arranged vertically, or horizontally but at the lower portion of the apparatus, which has been turned round. This makes it possible, where necessary, to immerse the sheet easily in a liquid bath in order to obtain, for example, stretching in a particular medium or a very rapid uniform distribution of temperature. The arrangement of all the stretching means of the apparatus on one side of the plane of the sheet to be stretched renders the sheet easily accessible.

The apparatus according to the invention is particularly suitable for laboratory or testing departments work, but it can easily be made to any size and of various materials so as to meet any industrial needs.

Many modifications may be made, for example:

The devices for clamping the sheet of plastics material can be constituted by self-locking grippers. Their opening and closing can also be controlled by any automatic devices, such as mechanical, or pneumatic devices.

It is often advantageous, more particularly in cases where considerable forces have to be applied in order to stretch thick panels, to guide the carriages by means of two slideways arranged on either side of the driving screw (see FIG. 3). It is also possible to guide the carriages by means of two parallel driving screws which thus act as slideways. In the case of one embodiment with two slideways or two parallel screws it is possible, if desired, to dispense with the frame 1 and thus to lighten the apparatus whilst retaining adequate rigidity.

If desired, more particularly for stretching very strong films, an apparatus can be used which is provided with several coupling devices driven by a plurality of motors or by a motor and a transmission means of suitable type, and each controlling the rotational movement of a group of several gearwheels meshing with one another, each group of gearwheels being arranged on a sector of one and the same circle.

It is thus possible to construct an apparatus of noncircular form, for example square, rectangular, elliptical etc. (see FIG. 4). The carriages provided with clamping devices are arranged on the screw-threaded rods in the selected form, for example a square. The carriages are driven by screw-threaded rods whose pitches are proportional to the respective distances of the carriages from the center of the square. The carriages are then displaced in accordance with concentric squares. In the same manner, it is possible to stretch in accordance with other geometric figures.

It is also possible to move the carriages provided with clamping devices along concurrent axes which are equally distributed along the generatrices of a cone, in which case the plastics material sheet can be stretched whilst resting on a fixed or mobile member. This arrangement makes it possible, for example, to carry out or facilitate a wrapping operation, or to stretch plastics material films which are not plane. Naturally, in this case the frame and the other elements are to be given an appropriate shape.

The apparatus according to the invention permits the stretching of plastics material, more particularly thermoplastic materials in the form of films sheets, skins, diaphragms, fabrics or panels. Stretching can be carried out at ambient temperature or in the hot state up the the highest temperatures compatible with the products being treated, in gases or in liquids.

It is possible to carry out successive heat treatments at different temperatures, for example using successively a plurality of heating chambers the temperatures of which have previously been regulated to appropriate values. It is also possible to carry out various heat treatments or cold treatments such as coating or spraying, during the course of stretching. The apparatus according to the invention makes it possible more particularly to carry out in the laboratory or workshop tests on samples for the purpose of studying their various mechanical, physical or chemical properties, but it may also be constructed with larger dimensions for the uniform stretching of sheets or panels of considerable surface area or considerable thickness. Finally, the apparatus can be adapted to fit into a production line, for example in order to carry out wrapping operations.

The apparatus according to the invention permits the uniform and substantially isotropic stretching of a very large portion of the initial surface of sheets of plastics material and allows easy access to the sheet being stretched to facilitate manipulations or treatments which have to be carried out. The apparatus is simple, light, compact and robust in construction, and can be introduced easily into conventional heating chambers, which enables successive treatments at greatly differing temperatures to be carried out rapidly, the apparatus withstanding the highest temperatures compatible with the products being treated.

EXAMPLE 1

An apparatus of the type shown in FIGS. 1 and 2 is used; its dimensions are as follows: diameter: 360 mm., height: 63 mm. (88 mm. with handles), weight: 7.950 kg. It can receive films of circular shape of at least 85 mm. in diameter and stretch them in circles reaching 290 mm. in diameter. The ratio of the film surfaces after and before stretching reaches 10, and the apparatus thus makes it possible to obtain a fairly high stretching rate. Since the ratio of the surface of the stretched film to the surface of the apparatus amounts to 0.645, only a small amount of space is wasted.

The apparatus, whose frame is arranged horizontally, is provided with a central bevel gearwheel arranged on a vertical axis and with 64 teeth, having a module of 1.25, meshing simultaneously on 12 horizontal-axis bevel gearwheels having 14 teeth which are each secured to a screw-threaded rod of 10 mm. diameter, with a 1.5 mm. pitch. One of these 12 screw-threaded rods is provided with a rapid coupling device which is connected to a 0.3 hp. geared motor set, the output speed of which can be regulated between 6 and 36 r.p.m. Each screw-threaded rod drives a carriage which is guided by a cylindrical parallel rod with a diameter of 8 mm., the 12 carriages being provided with grippers for holding the film during stretching, each of them over a width of 20 mm. and a depth of 6 mm.

The apparatus can be placed in a heating chamber with forced hot air circulation, and with internal dimensions of 400×400Φ520 mm., provided with a double-access door, the internal door being glazed, and also with appropriate lighting. The lateral wall of the heating chamber is formed with an aperture permitting the passage of the coupling device which transmits the movement causing the stretching of the film.

The stretching of a substantially amorphous film of polyethylene terephthalate is carried out with this apparatus. From a film of a width of 94 mm. obtained by extrusion in the molten state, there is cut a disc having a diameter of 90 mm., and a square having sides of 50 mm., centered on this disc, is drawn without scoring the disc. The thickness of the film is measured for stretching at eight marked points situated at the apices (A,B,C,D) and the centers (E,F,G,H) of the sides of the square. (The thicknesses measured are given in the table hereinafter). Then the disc is placed between the jaws of the 12 grippers which are clamped equally, with the inner faces of the grippers disposed on a 78 mm. diameter circle.

The stretching apparatus carrying the film is then put within a heating chamber of the type mentioned hereinbefore, the temperature of which has previously been regulated to 100° C. After about 10 minutes the temperature in the heating chamber is stabilized at about 100° C. and the temperature measured in contact with the film at about 90° C. Stretching is then begun, the geared motor set driving one of the screw-threaded rods at approximately 33 r.p.m. Through the glazed door of the heating chamber, the stretching of the film gripped gradually at a speed of 50 mm. per minute, until one of the grippers reaches an electrical end-of-travel contact (or the operator himself stops the stretching operation), after 129 seconds. The internal faces of the grippers and then disposed on a 281 mm. diameter circle which is reduced to 280 mm. in order to prevent any risk of inopportune tearing.

The thermal fixing of the film is then carried out in order to release its internal tensions, transferring the apparatus quickly to a second heating chamber similar to the first, which has previously been brought to a temperature of 180 ° C. It is left thus for 16 seconds and then removed and, after cooling, the grippers are unclamped and the stretched, stabilized film is released, and is substantially in the form of a 12-sided polygon. The square which had been drawn has been stretched to a square with a side length of 195 mm. without any distortion being detectable, which shows that stretching has been effected uniformly over the greater portion of the surface of the disc. A measurement of the thickness of the film at the eight points on the square which were defined hereinbefore gives the values shown in the following table. (The thickness differences noted are due substantially to the thickness variations of the film before stretching).

|  | Thickness of the film in microns at the various marked points | | | | | | | |
|---|---|---|---|---|---|---|---|---|
| Marked points | A | B | C | D | E | F | G | H |
| Before Stretching | 335 | 320 | 330 | 305 | 330 | 305 | 310 | 340 |
| After Stretching | 25 | 25 | 22 | 18 | 25 | 18 | 25 | 25 |

The stretching amounts obtained are:
a. along any diameter of the circles contacting the grippers
$$T_a = 100[(280-78)/78] = 259 \text{ percent}$$
b. along any side of the square drawn on the disc
$$T_b = 100 \frac{(195-50)}{50} = 290\%$$
c. in the thickness of the film
$$T_c = 100\left(\sqrt{\frac{ei}{ef}} - 1\right) = 278\%$$

where $ei = 322\ \mu$: mean initial thickness
$ef = 22.5\ \mu$: mean final thickness.

It will be noted that the stretching amounts $T_b$ and $T_a$ are near to one another in value, the stretching amount $T_a$ is smaller since the stretching has been less considerable locally in the vicinity of the grippers.

Then the stretched film is subjected to a tensile test in two directions perpendicular to one another in order to determine:
a. its resistance to rupture $R$
b. its elongation $A$ at the moment of rupture.
The following results are obtained:
in a first direction:
 $R$ = kg./cm.$^2$
 $A$ = 1,600 60 percent
in a direction perpendicular to the first direction
 $R$ = 1,780 kg/cm$^2$
 $A$ = 60 percent The values found are substantially of the same order of magnitude, taking into account the irregularities in thickness of the film before stretching. The film is thus stretched in a substantially isotropic manner.

EXAMPLE 2

An apparatus capable of stretching films of plastics material is constructed which is shown in FIGS. 5 and 6, the dimensions being as follows: diameter 360 mm., height 65 mm./95 mm.

of circular shape of a diameter of at least 90 mm. and stretches them in circles reaching 290 mm. in diameter. The ratio of the film surfaces after and before stretching is as much as 10, and the apparatus thus makes it possible to obtain fairly high stretching amounts. Since the ratio of the surface of the stretched film to the surface of the apparatus reaches 0.645, the bulk of the apparatus is not considerable in comparison with the surface of the stretched film.

The apparatus, whose frame (1) is arranged horizontally, is provided with 12 carriages each sliding by means of bronze sleeves along two slideways constituted by cylindrical steel rods having a diameter of 8 mm. Each carriage is driven by a screw-threaded rod having a diameter of 10 mm., a pitch of 1.5 mm., secured to a bevel gearwheel having 18 teeth and a module of 1.25. One of these 12 screw-threaded rods is provided with a rapid coupling device which is connected to a 0.3 hp. geared motor set and an output speed regulatable between 6 and 36 r.p.m. The 12 carriages are provided with grippers for holding the film during stretching, each over a length of 20 mm and a depth of 6 mm. Machining of the faces of the hub on which the gearwheels bear is effected to a precision of 0.005 mm., and the gearwheels are cut with the same tolerances and mesh with one another substantially without play. The respective angular positions of the screw-threaded rods and the slideways are defined with a precision equal to 12 seconds of an arc. The carriages are displaced on slideways by means of screw-threaded rods whose parallelism is regulated to within 0.01 mm. These can expand freely at the rim side by 0.2 mm.

The stretching of a film of polyethylene terephthalate is carried out as in the preceding example and under the same conditions.

It is found that, after having introduced the stretching apparatus into the heating chamber, the temperature in the chamber is stabilized at about 100 ° C. and the temperature measured in contact with the film at about 90° C. at the end of only 3 minutes. The stretching lasts 130 seconds and at the conclusion of stretching the internal faces of the grippers define a circle with a diameter of 226 mm. Measurements, before and after stretching, of the thickness of the film at the apices of the square drawn before stretching give the following values:

| Marked points | Thickness of the film in microns at the various marked points | | | |
|---|---|---|---|---|
| | A | B | C | D |
| Before stretching | 505 | 505 | 585 | 570 |
| After stretching | 49.5 | 49.5 | 50 | 49.5 |

It is noteworthy that the stretching with this apparatus has cancelled the considerable initial thickness inequalities and produces a sheet of a substantially uniform thickness.

The following stretching amounts are obtained:
a. on any diameter of the circles contacting the grippers:

$$T_a = 100[(226-77)77] = 194 \text{ percent}$$

b. on any side of the square drawn on the disc:

$$T_b = 100[(180-50)50] = 260 \text{ percent}$$

c. calculated in accordance with the mean thicknesses of the film before and after stretching:

$$T_c = 100\left[\sqrt{\frac{541}{49.7}} - 1\right] = 230\%$$

The stretched film is finally subjected to a tensile test again as in example 1: the following results are obtained:

| Characteristics | Direction 1 | Direction 2 |
|---|---|---|
| Breaking load in kg./cm.² | $R=815$ | $R=538$ |
| Elongation in % | $A=150$ | $A=125$ |
| Modulus of elasticity in kg./cm.² | 8,500 | 8,500 |

It will be noted that apart from the breaking load which shows the partially crystalline state of the stretched film, the elongation and the modulus of elasticity are of the same order of magnitude. Therefore, the film is stretched in a substantially isotropic manner.

We claim:
1. Apparatus for isotropically stretching a noncircular sheet of plastics, said apparatus comprising in combination:
   a. a central hollow hub;
   b. a rim coaxial with said central hollow hub;
   c. a plurality of separate screw-threaded rods arranged perpendicularly to the axis of said hollow hub and extending from said hollow hub to said rim, each rod being rotatable about its own axis;
   d. a plurality of slideways arranged perpendicularly to the axis of said hollow hub parallel to and in close proximity to said screw-threaded rods;
   e. a plurality of screw-threaded carriages, each threadably engaging on one of said screw-threaded rods, and slidable on one of said slideways;
   f. gripping means for gripping the sheet mounted on each carriage, said gripping means being disposed in an array of a particular configuration; and
   g. gearing, interconnecting said screw-threaded rods to cause rotation of each of the remaining rods, the pitches of the threads of said rods being such that at least one of said gripping means moves at a rate different from at least one of the remaining gripping means so as to maintain said configuration constant.

2. Apparatus as specified in claim 1, having at least five screw-threaded rods and carriages.

3. Apparatus as specified in claim 1, wherein a bevel gear is mounted at the inner end of each of said rods, wherein a single bevel gear is mounted on said hollow hub, and wherein said single bevel gear cooperates with each of the bevel gears mounted on said rods.

4. Apparatus as specified in claim 1, wherein a bevel gear is mounted at the inner end of each of said rods, and each of said bevel gears cooperates with the bevel gears on each of the adjacent rods, the pitch of the screw thread of each rod being oppositely directed to the pitch of the thread of each adjacent rod.

5. Apparatus as specified in claim 1, wherein a bevel gear is mounted at the inner end of each rod and wherein two idler gears are provided for each rod, each idler gear cooperating with the bevel gears on each of the adjacent rods.

6. Apparatus as specified in claim 1, wherein said configuration is a square, and the pitches of the threads of said rods are such that said square configuration is maintained.